US006412587B1

(12) United States Patent
Weimert et al.

(10) Patent No.: US 6,412,587 B1

(45) Date of Patent: Jul. 2, 2002

(54) VEHICLE EXHAUST SYSTEM WITH SUSPENSION ARRANGEMENT

(75) Inventors: Günter Weimert, Bad Wildbad; Harald Mann, Ludwigsburg; Jürgen Schorn, Rutesheim; Michael Wessels, Vaihingen/Enz, all of (DE)

(73) Assignee: Dr. Ing. h.c.F. Porsche AG, Weissach (DE)

(*) Notice: Subject to any disclaimer, the term of this patent is extended or adjusted under 35 U.S.C. 154(b) by 22 days.

(21) Appl. No.: 09/612,968

(22) Filed: Jul. 10, 2000

(30) Foreign Application Priority Data

Jul. 10, 1999 (DE) ........................................ 199 32 349

(51) Int. Cl.[7] ............................................... B60K 13/04

(52) U.S. Cl. .......................... 180/309; 180/296; 60/322

(58) Field of Search ................................ 180/296, 309, 180/89.2; 60/322, 272

(56) References Cited

U.S. PATENT DOCUMENTS 2,081,546 A * 5/1937 MacPherson ............... 180/296
3,746,127 A * 7/1973 Leventhal ................... 181/243
3,942,599 A * 3/1976 Shimada ..................... 180/292
3,977,486 A * 8/1976 Kleinschmit ................ 248/573
4,031,700 A * 6/1977 Yamazaki et al. ............ 60/322
4,074,525 A 2/1978 Le Salver
4,339,919 A 7/1982 Jobling et al.
4,494,722 A * 1/1985 Kanai et al. ................ 248/621
4,550,795 A * 11/1985 Teshima ..................... 180/296
4,884,399 A * 12/1989 Morris ........................ 60/313
4,893,778 A * 1/1990 Drabing et al. ............... 248/60
5,193,778 A * 3/1993 Unkrich ...................... 248/610
5,433,075 A * 7/1995 Nakmura et al. ............. 60/322
5,817,991 A * 10/1998 Suyama et al. ............. 181/243

FOREIGN PATENT DOCUMENTS

DE 972 483 7/1959

* cited by examiner

*Primary Examiner*—Robert P. Olszewski
*Assistant Examiner*—James S. McClellan
(74) *Attorney, Agent, or Firm*—Crowell & Moring LLP

(57) ABSTRACT

An exhaust system is provided which is intended for a power unit formed by the transmission and the internal-combustion engine which is installed into a motor vehicle having a body. The exhaust system, which has a muffler constructed as an oblong pipe body, is connected with the internal-combustion engine and is disposed by means of elastic elements. For achieving a defined advantageous vibration behavior of the exhaust system, a suspension arrangement is provided on the muffler, which suspension arrangement comprises the elastic elements, is applied to different wall areas of the muffler and is held on the transmission and/or the internal-combustion engine of the power unit by fastening devices, and preferably independently of the vehicle body.

17 Claims, 3 Drawing Sheets

B 9 11 21 19 41 42 23 22 12 13 14 15 17 40 18 10 16 1 7 8 6 5 2 20 3 B 4 1A

VEHICLE EXHAUST SYSTEM WITH SUSPENSION ARRANGEMENT

BACKGROUND AND SUMMARY OF INVENTION

This application claims the priority of German patent document 19932349.6, filed Jul. 10, 1999, the disclosure of which is expressly incorporated by reference herein.

The invention relates to an exhaust system for a power unit formed by the transmission and the internal-combustion engine and installed into a motor vehicle having a body, the exhaust system, which has a muffler constructed as an oblong pipe body, being connected with the internal-combustion engine and being disposed by means of elastic elements.

From U.S. Patent Document U.S. Pat. No. 4,074,525, it is known to connect an exhaust pipe by an elastic section with an outlet device of an internal-combustion engine. In addition, the exhaust pipe is connected by an elastic support to the floor of a motor vehicle body.

U.S. Patent Document U.S. Pat. No. 4,339,919 relates to a muffler which, on the one side, is connected by way of an exhaust pipe with an internal-combustion engine and, on the other side, is held by a carrying device on a frame part. An elastic bearing is arranged between the carrying device and the frame part.

In the DE Special Edition *ATZ Automobiltechnische Zeitschrift* and *MTZ Motortechnische Zeitschrift*, 1997, Page 81, an exhaust system of an internal-combustion engine is shown, in the case of which a muffler of the exhaust system is fastened on a transmission of the internal-combustion engine.

It is an object of the invention to suspend an exhaust system of an internal-combustion engine such that, while the bearing is good, it has an advantageous vibration behavior, particularly at low rotational speeds, for example, during idling operations.

According to the invention. this object is achieved by providing an arrangement of the above-noted type, wherein a suspension arrangement is provided on the muffler, which suspension arrangement comprises the elastic elements, is applied to different wall areas of the muffler and is held on the transmission and/or the internal-combustion engine of the power unit by fastening members and preferably independently of the vehicle body.

Principal advantages achieved by means of the invention are that, as a result of the special design of the suspension arrangement, the exhaust system, mainly a muffler of the latter, is optimized relative to the vibrations such that the idling jolting is at least reduced. Because of this suspension arrangement, the rotational idling speed of the internal-combustion engine can be lowered, which has an advantageous effect on the fuel consumption, possibly also on the exhaust emission of the above-mentioned internal-combustion engine. The first supporting device and the second supporting device comprise components with simple designs which cannot only be produced easily but can also easily be attached to the muffler or connected to the carrying console. Finally, by means of the connection member absorbing at least tensile loads, an additional coupling of the muffler is achieved which has a positive influence on the vibration behavior.

Other objects, advantages and novel features of the present invention will become apparent from the following detailed description of the invention when considered in conjunction with the accompanying drawings.

BRIEF DESCRIPTION OF THE DRAWINGS

The drawing shows an embodiment of the invention which will be described in detail in the following.

DETAILED DESCRIPTION OF THE DRAWINGS

Figure 1:
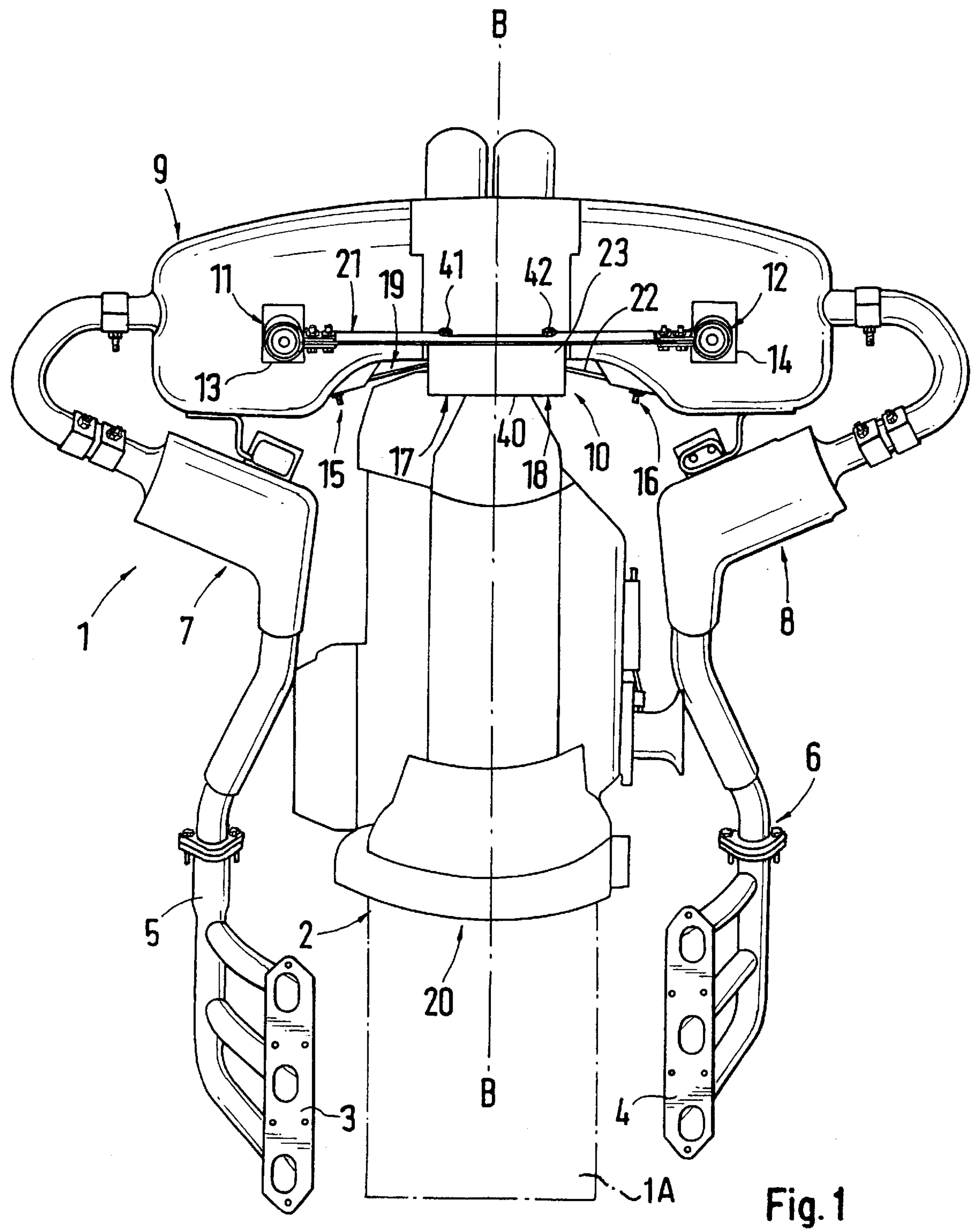
FIG. 1 is a top view of an exhaust system of an internal-combustion engine installed in a motor vehicle, constructed according to a preferred embodiment of the invention.

An exhaust system 1 is constructed for the guiding of exhaust gases of an internal-combustion engine 1A which is combined with a transmission 2 to form a power unit and is installed into a motor vehicle having a body. For the following explanations, essentially the exhaust system 1 and the transmission 2 are relevant, so that the vehicle with the body does not have to be shown in the drawings. The exhaust system 1 is connected by means of outlet devices 3, 4 to cylinder heads of opposed cylinder banks of a horizontally opposed construction of the internal-combustion engine 1A, and are connected with a muffler 9 by way of exhaust pipes 5, 6 of defined shapes which are provided with catalysts 7, 8. The muffler 9, which is illustrated by an oblong body with an approximately rectangular cross-section, extends transversely to a longitudinal center plans B—B of the motor vehicle, which also forms the basic direction of the dimension of the transmission 2 and the internal-combustion engine 1A.

The muffler 9 is provided with a suspension arrangement 10 which at least partially by means of elastic elements 11, 12 is applied to various wall areas 13, 14 and 15, 16 of the muffler 9. The suspension arrangement 10 is held by means of screws 17, 18 on the transmission 2 which extends, by means of a first free end 19, adjacent to the muffler 9. A second end 20 of the transmission 2 directly adjoins the internal-combustion engine.

Figure 2:
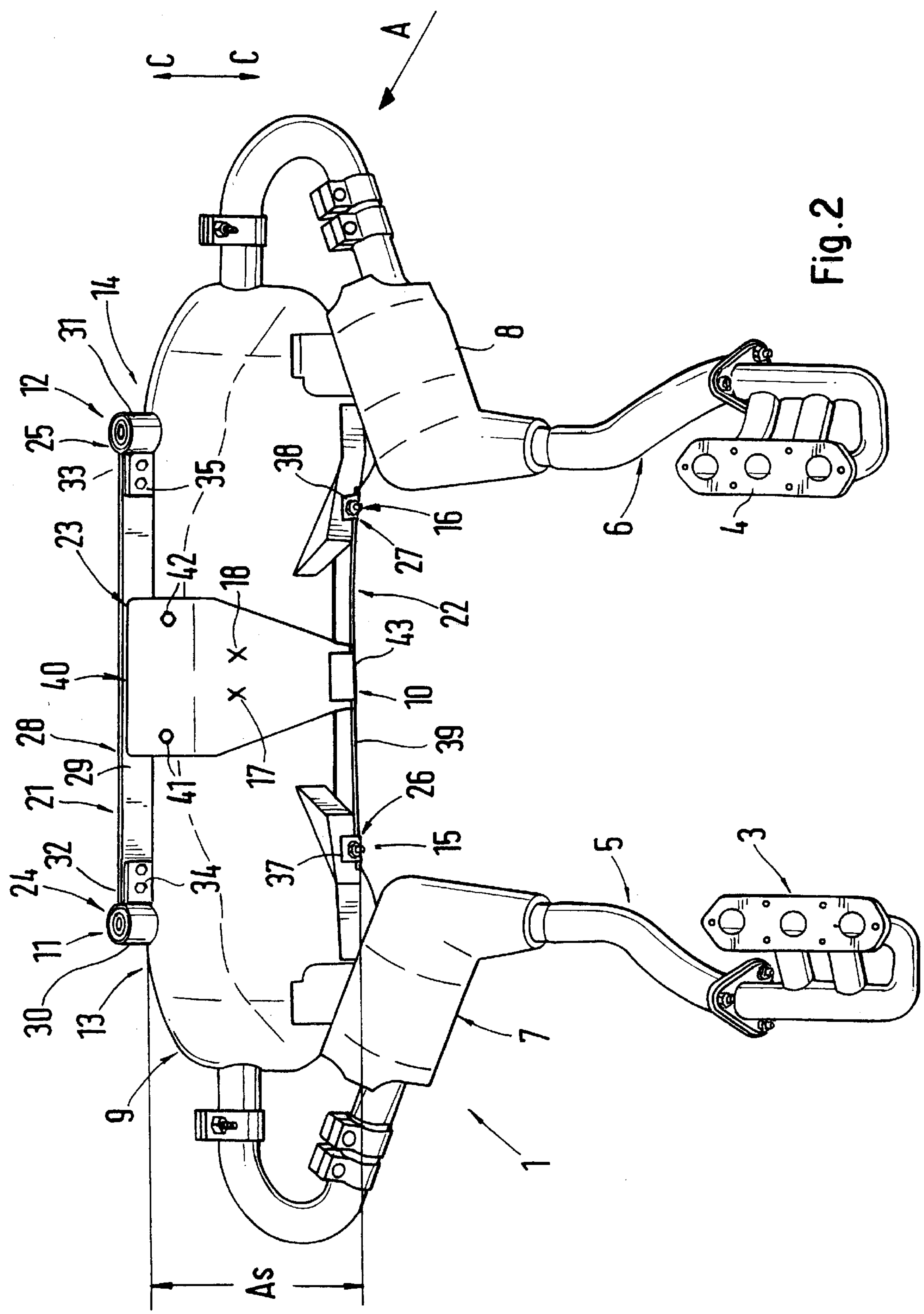
FIG. 2 is a diagonal top view of the exhaust system of FIG. 1.
Figure 3:
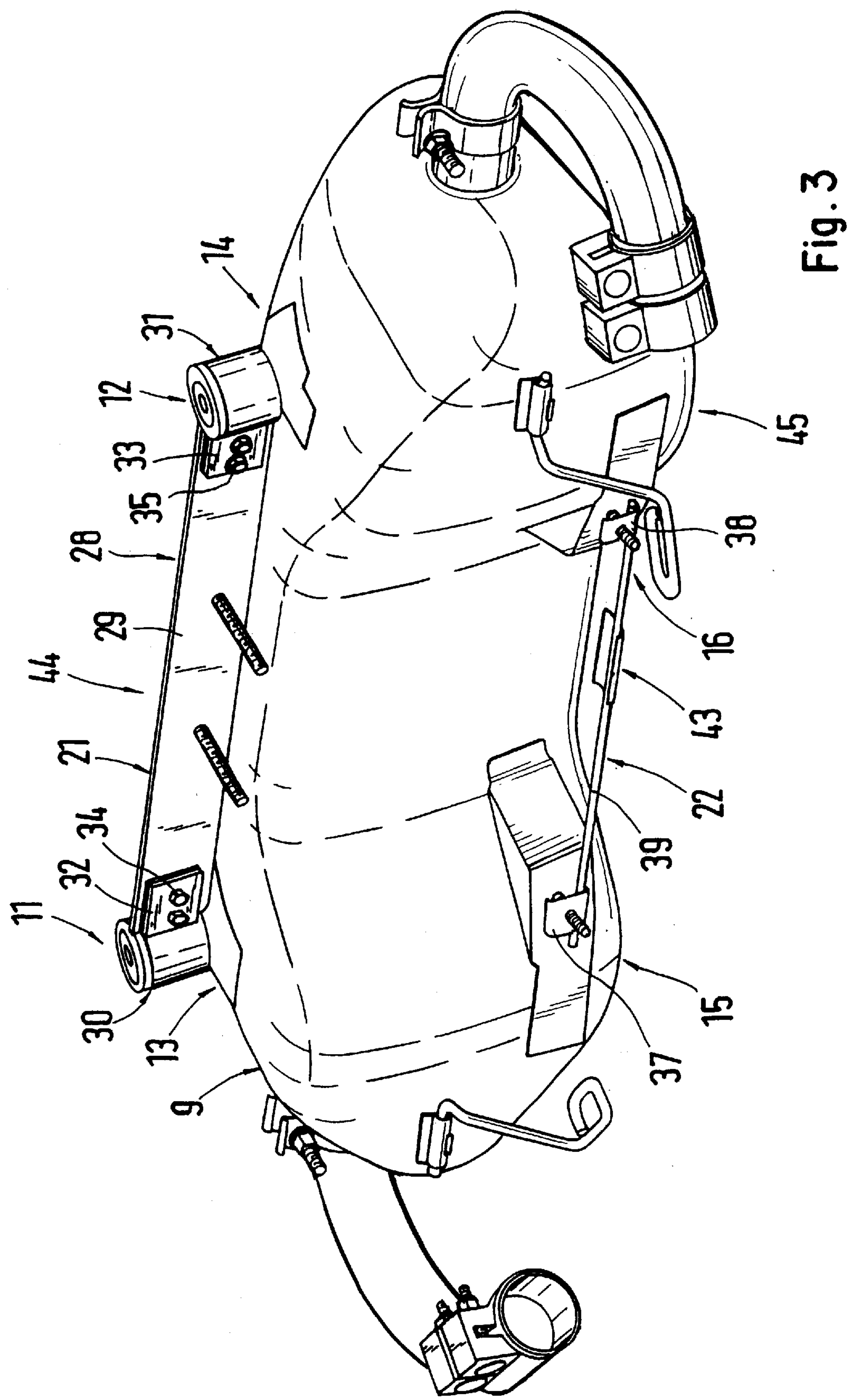
FIG. 3 is a diagonal view of FIG. 1 approximately in the direction of the arrow A of FIG. 2.

The suspension arrangement comprises a first supporting device 21 and a second supporting device 22 which are arranged at a distance "As" (FIG. 2) with respect to one another on the muffler 9. The two supporting devices 21 and 22 are connected with one another by way of a carrying console 23. In this case, the first supporting device 21 extends, by means of fastening members 24, 25 to the muffler 9; the second supporting device 21 extends to the muffler by means of fastening members 26, 27.

The elastic elements 11, 12 are integrated in the first supporting device 21 into the fastening members 24, 25 which are spaced with respect to one another and extend to the wall areas 13, 14 of the muffler 9. A horizontal leaf-spring-type strut 28 extends between the elastic elements 11, 12, the longer side 29 of the strut 28 pointing in the vertical direction C—C of the vehicle. Each elastic element, for example, 11, is constructed as a cylindrical sleeve-type sliding spring whose design takes place by the use of iterative and/or mathematical measures. In addition, the elastic elements 11, 12 are surrounded by hose-clip-type holding parts 30, 31 which have fastening flanges 32, 33. The fastening flanges 32, 33 receive the strut 28, specifically by means of screws 34 and 35. The second supporting device 22 has the fastening members 26, 27 which are formed by holders 37, 38 and which are connected to the wall areas 15, 16 of the muffler 9. The holders 37, 38 are in an operative connection with a connection member 39 which may be a rope and will absorb only tensile loads. However, it is also conceivable to construct the connection member 39 as a rod which transmits tensile loads as well as pressure loads.

The carrying console 23 is a dimensionally stable plate 40 which is connected with the leaf-spring-type strut 28 by means of screws 41, 42 and with the connection member 39 by means of a clamping device 43. In addition, the carrying console 23 is connected by way of the screws 17, 18 with the first end 18 of the transmission 2.

Finally, the muffler 9 of the exhaust system has a top side 44 and a bottom side 45, and the first supporting device 21 and the second supporting device 22 extend adjacent to this top side 44 and this bottom side 45 of the above-mentioned muffler.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Exhaust system comprising a muffler and a suspension arrangement provided on the muffler, said suspension arrangement comprising:

a first supporting device connected to a first area of the muffler, a second supporting device connected to a second area of the muffler which is spaced from the first area, and a carrying console connecting the first and second supporting devices together, wherein the first supporting device includes a leaf spring type strut with two spaced elastic fastening members.

2. Exhaust system according to claim 1, wherein each elastic fastening member of the first supporting device is constructed in the manner of a cylindrical sleeve-type slide spring.

3. Exhaust system according to claim 2, wherein the elastic fastening members of the first supporting device are provided with hose-clip type holding parts, said strut being inserted between fastening flanges of these holding parts and being held in position by screws.

4. Exhaust system according to claim 2, wherein the carrying console is a dimensionally stable plate which is connected in use with a vehicle transmission by screws.

5. Exhaust system according to claim 2, wherein the muffler is an oblong muffler having a top side and a bottom side, and wherein the first supporting device extends adjacent to the top side of the muffler and the second supporting device extends adjacent to the bottom side of the muffler.

6. Exhaust system according to claim 1, wherein the elastic fastening members of the first supporting device are provided with hose-clip type holding parts, said strut being inserted between fastening flanges of these holding parts and being held in position by screws.

7. Exhaust system according to claim 6, wherein the muffler is an oblong muffler having a top side and a bottom side, and wherein the first supporting device extends adjacent to the top side of the muffler and the second supporting device extends adjacent to the bottom side of the muffler.

8. Exhaust system according to claim 1, wherein the second supporting device has fastening members constructed as holders which are in an operative connection with a connection member absorbing at least tensile loads.

9. Exhaust system according to claim 8, wherein the connection member is a rope.

10. Exhaust system according to claim 8, wherein the connection member is a rod absorbing tension and pressure loads.

11. Exhaust system according to claim 1, wherein the carrying console is a dimensionally stable plate which is connected in use with a vehicle transmission by screws.

12. Exhaust system according to claim 11, wherein the muffler is an oblong muffler having a top side and a bottom side, and wherein the first supporting device extends adjacent to the top side of the muffler and the second supporting device extends adjacent to the bottom side of the muffler.

13. Exhaust system according to claim 1, wherein the muffler is an oblong muffler having a top side and a bottom side, and wherein the first supporting device extends adjacent to the top side of the muffler and the second supporting device extends adjacent to the bottom side of the muffler.

14. Exhaust system comprising a muffler and a suspension arrangement provided on the muffler, said suspension arrangement comprising:

a first supporting device connected to a first area of the muffler, a second supporting device connected to a second area of the muffler which is spaced from the first area, and a carrying console connecting the first and second supporting devices together, wherein the second supporting device has fastening members constructed as holders which are in an operative connection with a connection member absorbing at least tensile loads, and wherein the connection member is a rope.

15. Exhaust system according to claim 14, wherein the carrying console is a dimensionally stable plate which is connected in use with a vehicle transmission by screws.

16. Exhaust system according to claim 15, wherein the muffler is an oblong muffler having a top side and a bottom side, and wherein the first supporting device extends adjacent to the top side of the muffler and the second supporting device extends adjacent to the bottom side of the muffler.

17. Exhaust system according to claim 14, wherein the muffler is an oblong muffler having a top side and a bottom side, and wherein the first supporting device extends adjacent to the top side of the muffler and the second supporting device extends adjacent to the bottom side of the muffler.

* * * * *